United States Patent
Takeda et al.

(10) Patent No.: US 6,783,666 B2
(45) Date of Patent: Aug. 31, 2004

(54) WATER SOFTENING DEVICE AND METHOD FOR REGENERATION CONTROL THEREOF

(75) Inventors: Hiroyuki Takeda, Matsuyama (JP); Hitoshi Asamura, Matsuyama (JP)

(73) Assignees: Miura Co., Ltd., Matsuyama (JP); Miura Institute of Research & Development Co., Ltd., Matsuyama (JP)

( * ) Notice: Subject to any disclaimer, the term of this patent is extended or adjusted under 35 U.S.C. 154(b) by 0 days.

(21) Appl. No.: 10/178,708

(22) Filed: Jun. 25, 2002

(65) Prior Publication Data
US 2002/0195403 A1 Dec. 26, 2002

(30) Foreign Application Priority Data
Jun. 26, 2001 (JP) ........................................ 2001-192093

(51) Int. Cl.$^7$ ............................... C02F 1/42; C02F 1/68
(52) U.S. Cl. .................. 210/96.1; 210/143; 210/198.1; 210/253; 700/271
(58) Field of Search ................................ 210/253, 340, 210/341, 749, 143, 96.1, 241, 190, 198.1; 700/271

(56) References Cited

U.S. PATENT DOCUMENTS

| | | | | |
|---|---|---|---|---|
| 2,774,732 A | * | 12/1956 | Blight | 210/662 |
| 3,964,999 A | * | 6/1976 | Chisdes | 210/651 |
| 4,049,548 A | * | 9/1977 | Dickerson | 210/96.1 |
| 4,275,448 A | * | 6/1981 | Le Dall | 700/271 |
| 4,490,249 A | * | 12/1984 | Seal | 210/89 |
| 4,539,106 A | * | 9/1985 | Schwartz | 210/88 |
| 4,668,386 A | * | 5/1987 | Seal et al. | 210/91 |
| 2002/0149489 A1 | * | 10/2002 | Bearak | 340/618 |

* cited by examiner

Primary Examiner—Terry K. Cecil
(74) Attorney, Agent, or Firm—Birch, Stewart, Kolasch & Birch, LLP (57) ABSTRACT

A water softening device and a method for regeneration control thereof, in which the hardness of feedwater to be softened is detected with the lapse of time and regeneration timing is controlled based on the detected value. The invention includes an inlet hardness measurement device for measuring the hardness of feedwater to a water softener, treated water quantity measurement device for measuring a flow rate of treated water after passing through the water softener, brine concentration detection device for detecting the concentration of brine in regeneration operation, and brine consumption detection device for detecting tile consumption of brine in regenerating operation. Further, there are included hardness leakage detecting device for measuring the hardness of treated water after passing through the water softener and detecting hardness leakage.

8 Claims, 3 Drawing Sheets

WATER SOFTENING DEVICE AND METHOD FOR REGENERATION CONTROL THEREOF

BACKGROUND OF THE INVENTION

The present invention relates to a water softening device for softening raw water containing hardness components by ion exchange, and to a method for regeneration control thereof.

As generally known, feedwater lines to heating and cooling apparatuses such as boilers, water heaters, or radiators are connected to devices for removing hardness components contained in feedwater for preventing scaling in the heating and cooling apparatuses, among which an automatic regenerative water softener for removing hardness components with use of ion exchange resin is widely adopted. This type of water softer uses $Na^+$ type ion exchange resin to replace metal cation such as $Ca^{2+}$ and $Mg^{2+}$, i.e., hardness components contained in water, with $Na^+$ for removing the hardness components. When the ion exchange resin is replaced with cation and saturated, and thereby exhausted capability of removing the hardness components, the ion exchange resin is reacted with brine for performing regenerating operation for regenerating the capability.

Generally, effective regenerating operation is preferably conducted by detecting a saturation degree of the ion exchange resin, feeding a required minimum amount of regenerative brine according to respective conditions, and performing regeneration control at the proper time in conformity with the saturation degree. As a conventional control method, there is a metered regeneration method, in which in installing the water softener, the hardness of feedwater in the installation site is measured in advance, the quantity of treatable water by a specified amount of the ion exchange resin (i.e., the quantity of water that the ion exchange resin can soften till regenerating operation is put into operation) is calculated based on the measured value, and regenerating operation is carried out when flow volume of feedwater reaches the calculated quantity of treatable water.

In the metered regeneration method, the hardness of feedwater fed to raw water lines is determined by detecting the hardness of feedwater (underground water, tap water, etc.) in advance at the time of installing the water softener, and calculating the quantity of treatable water based on the detected value. However, the hardness of the feedwater, especially in the case of underground water fluctuates by seasonal factors. Therefore, in order to prevent the ion exchange resin from reaching a breakthrough point (hardness leakage), the quantity of treatable water is reduced from the calculated value to be a fail-safe quantity. Eventually, even when the ion exchange resin has a softening ability (so called a remaining ability), regenerating operation may be carried out, which wastes brine for regenerating operation.

SUMMARY OF THE INVENTION

In view of the above stated problem, an object of the present invention is to provide a water softening device and a method for regeneration control thereof, in which the hardness of feedwater to be softened is detected with the lapse of time and regeneration timing is controlled based on the detected value.

The present invention has been invented to solve the above-stated problem. An invention according to a first aspect is composed of inlet hardness measurement means for measuring hardness of feedwater to a water softener, treated water quantity measurement means for measuring a flow rate of treated water after passing through the water softener, brine concentration detection means for detecting concentration of brine in regenerating operation, and brine consumption detection means for detecting consumption of brine in regenerating operation.

An invention according to a second aspect is composed of hardness leakage detection means for measuring hardness of treated water after passing through the water softener and detecting hardness leakage.

An invention according to a third aspect is composed of a plurality of water softening devices disposed and connected in parallel with water flowing operation and regenerating operation of each water softening device switchable, the water softening device composed of inlet hardness measurement means for measuring hardness of feedwater to a water softener, treated water quantity measurement means for measuring a flow rate of treated water after passing through the water softener, brine concentration detection means for detecting concentration of brine in regenerating operation, and brine consumption detection means for detecting consumption of brine in regenerating operation.

An invention according to a fourth aspect is characterized in that a branching portion for branching feedwater to each of the water softeners is provided on a feedwater line to each of the water softeners, and joint means for joining treated water from each of the water softeners is provided, the joint means being connected to a treated water line.

An invention according to a fifth aspect is characterized in that the inlet hardness measurement means is provided upstream to the branching portion and the treated water quantity measurement means is provided downstream from the joint means.

An invention according to a sixth aspect is characterized in that the hardness leakage detection mean for measuring hardness of treated water after passing through the water softener and detecting hardness leakage is provided downstream from the joint means.

An invention according to a seventh aspect includes a singularity of brine tank, the brine tank being connected to each of the water softeners in a switchable way via switching means provided on a brine line, the brine concentration detection means being provided upstream to the switching means.

An invention according to an eighth aspect is characterized in that the brine consumption detection means is provided on the brine tank.

An invention according to a ninth aspect is composed of the steps of setting in advance a setting value of a hardness removal amount till a next regenerating operation based on brine concentration in regenerating operation and brine consumption in regenerating operation; obtaining an integrated value of a hardness removal amount with lapse of time based on inlet hardness and a quantity of treated water, and commencing regenerating operation when the integrated value reaches the setting value.

An invention according to a tenth aspect is characterized in that when hardness of treated water after passing through the water softener is measured and hardness leakage is detected, regenerating operation is commenced immediately.

Description will now be given of the embodiment of the present invention. The invention is applicable to a water softening device composed of a means for measuring the hardness of feedwater to a water softener on an inlet side of the water softener, a means for measuring the flow rate of treated water after passing through the water softener, a means for detecting the concentration of brine in regenerating operation, a means for detecting the consumption of brine in regenerating operation, and a control unit for controlling regenerating operation of the water softener based on the detected value by the inlet hardness measurement means, the flow rate of treated water, the brine concentration in regenerating operation, and the brine consumption in regenerating operation.

The water softening device is basically made up of a resin tank filled with ion exchange resin and a control valve. The control valve is connected to a feedwater line to feed water to the resin tank and a treated water line to feed softened water to a soft water tank. The control valve is connected to a brine tank via a brine line as well as to a drain line. The feedwater line is provided with an inlet hardness measurement means as a hardness detection means for measuring the hardness of feedwater, the treated water line is provided with a treated water quantity measurement means and a hardness leakage detection means, the brine line is provided with a brine concentration detection means, and the brine tank is provided with the brine consumption detection means. Further, the inlet hardness measurement means, the control valve, the treated water quantity measurement means, the hardness leakage detection means, the brine concentration detection means, and the brine consumption detection means are each connected to a control unit via a signal line.

For supporting continuous supply of treated water for over 24 hours, there is a configuration of disposing a plurality of water softening devices in parallel. Basically in this configuration, a plurality of the water softening devices, each composed of the inlet hardness measurement means, the control valve, the treated water quantity measurement means, the brine concentration detection means, and the brine consumption detection means, are disposed in parallel. Each of the water softening devices is connected in a switchable way so as to independently perform such operation as water flowing operation and regenerating operation. More particularly, between the feedwater line and the treated water line, a plurality of water softening devices, each having an independent water softening function, are connected in parallel in a switchable way. This enables the water softening devices to be switched to such operation state as a water flowing state, a regenerating state, and a standby state, resulting in supporting continuous supply of treated water for over 24 hours.

In the configuration of disposing a plurality of the water softening devices in parallel, among the components composing each of the water softening devices, the sharable components are connected so as to be sharable.

In disposing the inlet hardness measurement means, a branching portion for branching the feedwater line is provided on the feedwater line to feed feedwater to each of the water softening devices, and the inlet hardness measurement means is provided upstream to the branching portion. Consequently, the inlet hardness of feedwater to each of the water softening devices may be detected with one measurement means.

In disposing the brine concentration detection means, a singularity of brine tank and each of the water softening devices are connected via a brine line, on which a switching means for switching brine feed to each of the water softening devices is provided, and a singularity of the brine concentration detection means is provided upstream to the switching means. Consequently, brine concentration in each of the water softening devices in regenerating operation may be separately detected with one detection means. Here, the brine concentration detection means may be provided not only on the brine line but also on the brine tank. More specifically, as long as the brine concentration detection means is provided upstream to the switching means, it may be provided not only on the brine line but also on the brine tank.

In disposing the brine consumption detection means, the brine consumption detection means is provided on a singularity of the brine tank. Consequently, brine consumption in each of the water softening devices in regenerating operation may be separately detected with one detection means.

In disposing the treated water quantity measurement means, a joint means for joining treated water from each of the water softening devices is provided on the treated water line, and the treated water quantity measurement means is provided downstream from the joint means. Consequently, the quantity of treated water in water flowing operation in each of the water softening devices may be separately detected with one measurement means.

Further, in the configuration of disposing a plurality of the water softening devices in parallel, a hardness leakage detection means for measuring the hardness of treated water and detecting hardness leakage may be provided. In this case, the hardness leakage detection means may be provided separately on each treated water line in each of the water softening devices or a singularity of the hardness leakage detection means may be provided downstream from the joint means. In the latter configuration, the hardness leakage during water flowing operation in each of the water softening devices may be detected separately with one detection means.

Description will now be given of a control method of the above-configured water softening device. The control method in the present invention includes the steps of obtaining the setting value of a hardness removal amount till a next regenerating operation based on brine concentration in regenerating operation and brine consumption in regenerating operation, obtaining an integrated value of the hardness removal amount with lapse of time based on a detected value by the inlet hardness measurement means provided on the feedwater line for feeding water and a detected value by a flow rate detection means for detecting the flow rate of softened water, and commencing regenerating operation of a water softener when the integrated value becomes equal to the setting value. More particularly, when an exchange ability of ion exchange resin filled in the resin tank of the water softener (after regeneration, the regeneration degree is determined by the concentration of brine in regenerating operation and the exchange ability of ion exchange resin is uniformly determined by the regeneration degree and consumption of salt) becomes almost equal to an integrated hardness removal amount obtained by the hardness measured by the inlet hardness measurement means and the flow rate measured by the flow rate detection means (i.e. an exchange amount of ion exchange resin that performed ion exchange), notification is sent to a control unit and regenerating operation is thereby commenced.

Also in the configuration of disposing a hardness leakage detection means on the treated water line, if ion exchange resin reaches a treatment limit earlier than expected due to deterioration of the ion exchange resin and the like and thereby causes hardness leakage, the hardness leakage detection means detects the leakage and reports it to the control unit for immediately commencing regenerating operation.

As described above, the water softening device and the method for regeneration control thereof according to the present invention enables efficient regeneration of ion exchange resin and further implements reliable and proper regeneration.

DETAILED DESCRIPTION OF THE PREFERRED EMBODIMENTS

Embodiments

Figure 1:
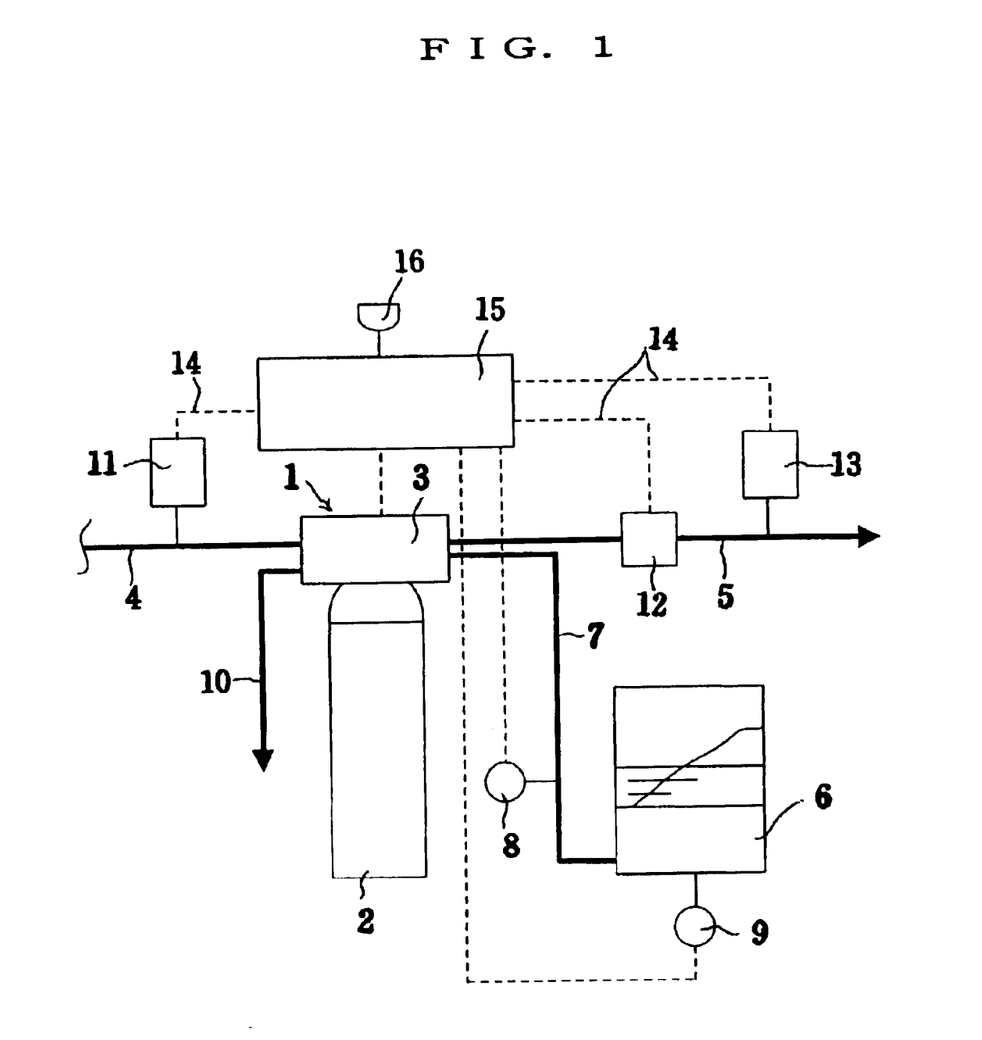
FIG. 1 is a schematic view showing an outline of a first embodiment of the present invention.

Hereinbelow, the embodiment of the present invention will be described in detail with reference to the accompanying drawings. FIG. 1 is a schematic view showing an outline of a first embodiment of the present invention.

In FIG. 1, a water softening device according to the present invention includes a water softener 1 which is basically composed of a resin tank 2 filled with ion exchange resin (illustration omitted) and a control valve 3. The control valve 3 is connected to a feedwater line 4 for feeding water to the control valve 3 and to a treated water line 5 for feeding softening-treated water to a soft water tank (illustration omitted). The control valve 3 is also connected to a brine tank 6 storing brine for regenerating the ion exchange resin through a brine line 7. The brine line 7 is equipped with a brine concentration detection means 8 for detecting the concentration of brine to be fed from the brine tank 6 to the resin tank 2. The brine tank 6 is equipped with a brine consumption detection means 9 for detecting the consumption of brine to be fed from the brine tank 6 to the resin tank 2. Further, on the opposite connection side of the brine line 7, there is connected a drain line 10.

The feedwater line 4 is provided with an inlet hardness measurement means 11 for detecting the hardness of feedwater on the inlet side of the water softener 1. The treated water line 5 is provided with a treated water quantity measurement means 12 for measuring the flow rate of treated water after passing through the water softener 1, and a hardness leakage detection means 13 for measuring the hardness of treated water after passing through the water softener 1 to detect hardness leakage. Further, the control valve 3, the brine concentration detection means 8, the brine consumption detection means 9, the inlet hardness measurement means 11, the treated water quantity measurement means 12, and the hardness leakage detection means 13 are each connected to a control unit 15 via a signal line 14. The control unit 15 is equipped with an alarm 16 for notifying hardness leakage to the outside.

The inlet hardness measurement means 11 is a hardness measurement device for providing accurate detection of the hardness contained in feedwater, which employs such method as determining the hardness by color development when an indicator for hardness measurement is added. In the method with use of the indicator for hardness measurement, the indicator for hardness measurement is added to a specified amount of feedwater accommodated in a transparent container (illustration omitted) and a change in hue of the feedwater due to reaction of the indicator for hardness measurement is measured from absorbance obtained by radiating a ray of light having a specified wavelength to measure the hardness of the feedwater. Thus-measured hardness of feedwater is reported to the control unit 15.

The brine concentration detection means 8 is a device for providing accurate measurement of the concentration of brine used for regeneration. As the electric conductivity of brine differs by concentration, measurement of the electric conductivity enables detection of the concentration of brine. The detection of the concentration may be achieved by measuring the refractive index of brine as well as by measuring the electric conductivity. As a concentration sensor, there are known ultrasonic sensors and the like. Here, the brine concentration detection means 8 may be also preferably provided on the brine tank 6 corresponding to respective application.

Further, the brine consumption detection means 9 is a device for providing accurate measurement of the amount of brine used for regeneration. There is a method, for example, for mounting the brine tank 6 on a scale (illustration omitted) to detect the consumption from change of the weight. There is another method in which the consumption of salt is detected from the amount of brine flowing in the resin tank 2. Also there is a method for attaching a pressure sensor (illustration omitted) to the lower portion of the brine tank 6 to detect the consumption of brine from change of the water head. This method makes it possible to chase the change of specific gravity of brine till the brine becomes saturated brine from change of the water head, which enables detection of neglect and shortage of salt dosage, and the like.

A method for regeneration control of the above-configured water softening device is purposed to efficiently control regeneration commencing time of the ion exchange resin when the hardness of feedwater during feeding is changed by seasonal factors. Accordingly, the concentration of brine is first calculated from a detected value by the brine concentration detection means 8 in the previous regenerating operation, and based on the calculated value, a regeneration degree is determined. Similarly, from a detected value by the brine consumption detection means 9 in the previous regenerating operation, the consumption of brine is calculated. Then, based on the determination result of the regeneration degree and the calculated consumption, a setting value of a hardness removal amount available by the next regeneration is obtained. Next, based on a detected value (inlet hardness) by the inlet hardness measurement means 11 and a detected value (quantity of treated water) by the treated water quantity measurement means 12 during water flowing operation, an integrated value of a hardness removal amount during water flowing operation is obtained with the lapse of time. The water softening device is controlled so that when the integrated value becomes equal to the setting value, the water flowing operation is terminated and regenerating operation is commenced. Therefore, the regeneration commencing time of the ion exchange resin is controlled based on the setting value and the integrated value.

Control of the regeneration commencing time is implemented by increasing or decreasing the water flow to the ion exchange resin based on the result of the hardness measurement of feedwater on the inlet side of the water softener 1. Increase or decrease of the flow rate is in actuality implemented by elongating or shortening the water flowing time. More particularly, with high inlet hardness, the integrated value reaches the setting value relatively fast, so that the water flowing time is set relatively short. With low inlet hardness, the integrated value reaches the setting value relatively slow, so that the water flowing time becomes relatively long in contrast. According to the control method, therefore, the flow rate conforming to the setting value of the ion exchange resin may be specified in response to the inlet hardness of feedwater.

As for regenerating operation, at the point when a treatment capability of the ion exchange resin is depleted, that is when the setting value becomes equal to the integrated value, regenerating operation is commenced, which enables regeneration with a required minimum amount of brine, thereby eliminating waste of brine. In other words, regeneration will not be commenced when an remaining ability of the ion exchange resin is present, which eliminates waste of brine.

Further, the hardness leakage detection means 13 is a backup control means when feedwater is under softening treatment. When hardness leakage is reported from the hardness leakage detection means 13 to the control unit 15, the control unit 15 determines that degradation of the ion exchange resin and the like occurs and raises an alarm from the alarm 16 to notify the hardness leakage, while shifting the operation of the water softener 1 to regenerating operation.

Figure 2:
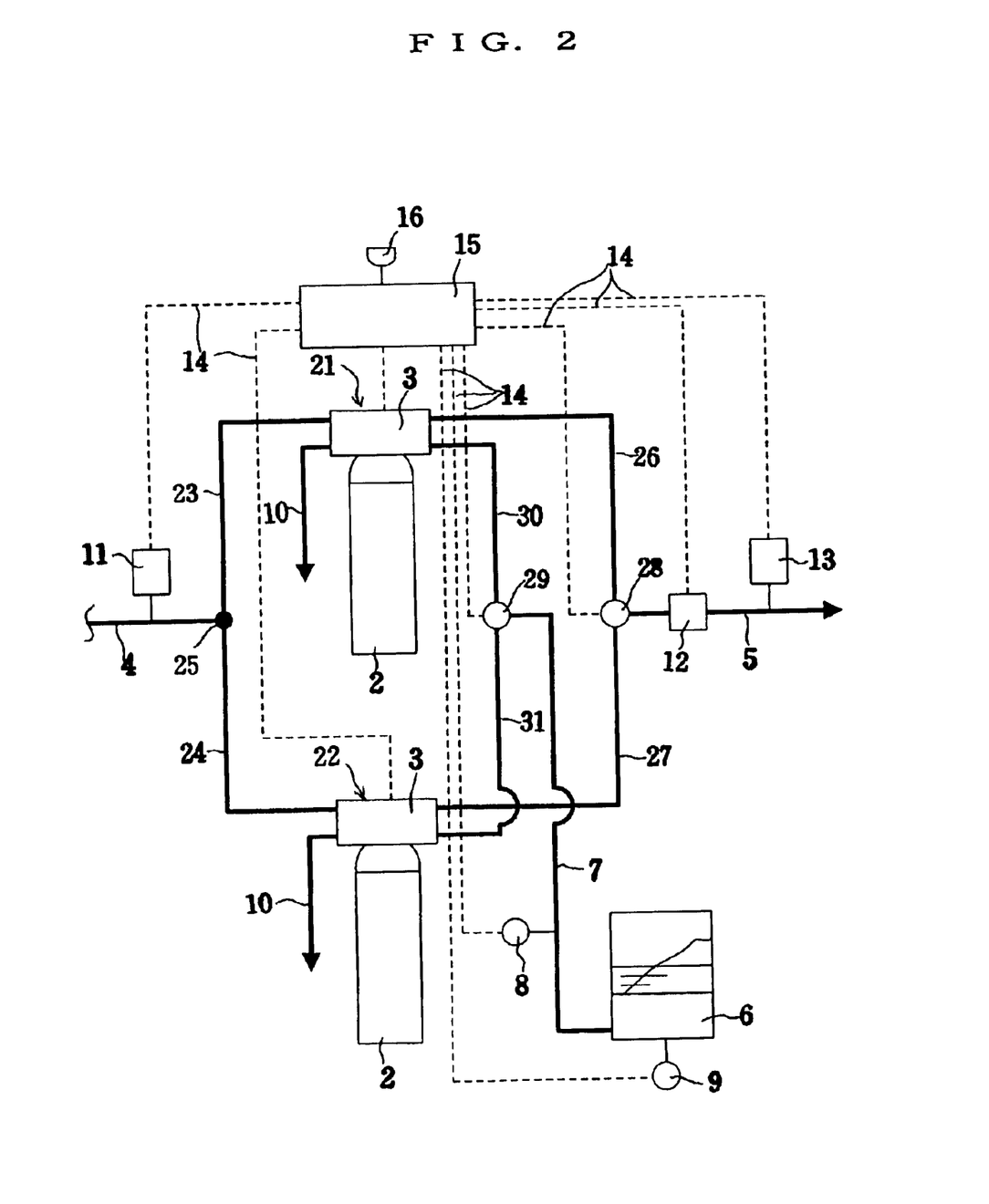
FIG. 2 is a schematic view showing an outline of a second embodiment of the present invention.

Next, the second embodiment of the present invention will be described in detail with reference to FIG. 2. In FIG. 2 showing the second embodiment, the reference numerals same as those used in FIG. 1 showing the first embodiment designate the same component members, and therefore detailed description thereof will be omitted.

FIG. 2 is a schematic view showing a configuration for supporting the case of requiring a continuous supply of water treated by a water softening device for over 24 hours, in which two water softeners 1 are disposed in parallel. In FIG. 2, among the components composing the water softening device, the sharable components are shown as shared.

In FIG. 2, a first water softener 21 and a second water softener 22 are disposed in parallel between the feedwater line 4 and the treated water line 5, and each softener is connected so as to be individually in the state of water flowing operation (water softening operation) and in the state of regenerating operation.

First, description will be given of the inlet side of feedwater in the both water softeners 21 and 22. The both water softeners 21 and 22 and the feedwater line 4 are connected to each other through a first feedwater line 23 and a second feedwater line 24 branched from the feedwater line 4. Upstream to a branching portion 25 of the both feedwater lines 23 and 24 (i.e., a portion of the feedwater line 4), the inlet hardness measurement means 11 is provided. Consequently, providing a singularity of the inlet hardness measurement means 11 enables detection of the inlet hardness of feedwater to the both water softeners 21 and 22. It is natural that the inlet hardness measurement means 11 is preferably provided on the both feedwater lines 23 and 24 corresponding to respective application.

Next description will be given of the outlet side of treated water in the both water softeners 21 and 22. A first treated water line 26 of the first water softener 21 and a second treated water line 27 of the second water softener 22 are joined via a joint means 28 such as three-way valves, the joint means 28 being connected to the treated water line 5. Switching operation of the joint means 28 connects either the treated water line 26 or 27 to the treated water line 5. Downstream from the joint means 28 (i.e., a portion of the treated water line 5), the treated water quantity measurement means 12 is provided. Consequently, providing a singularity of the treated water quantity measurement means 12 enables individual detection of the quantity of treated water when water flows through each of the water softeners 21 and 22. Similar to the inlet hardness measurement means 11, it is natural that the treated water quantity measurement means 12 is preferably provided on the both treated water lines 26 and 27 corresponding to respective application.

Next description will be given of the brine concentration detection means 8. The brine concentration detection means 8 is provided on the brine line 7 which connects the brine tank 6 to each of the water softeners 21 and 22. Description will herein given of a configuration in the case of disposing a singularity of the brine tank 6 as a practical example of the embodiment. On the downstream side or the side closer to the both water softeners 21 and 22, the brine line 7 is branched into a first brine line 30 and a second brine line 31 via a switching means 29 such as three-way valves, the first brine line 30 being connected to the control valve 3 of the first water softener 21 while the second brine line 31 being connected to the control valve 3 of the second water softener 22. Therefore, switching operation of the switching means 29 feeds brine in the brine tank 6 to either the water softener 21 or 22. Upstream to the switching means 29, a singularity of the brine concentration detection means 8 is provided on the brine line 7. Consequently, providing a singularity of the brine concentration detection means 8 enables individual detection of the concentration of brine in regenerating operation in each of the water softeners 21 and 22. Here, the brine concentration detection means 8 may be preferably provided on the brine tank 6 corresponding to respective application. Further, similar to the inlet hardness measurement means 11 and the treated water quantity measurement means 12, providing the brine concentration detection means 8 on the both brine lines 30 and 31, that is providing the brine concentration detection means 8 on the both water softeners 21 and 22, is preferable corresponding to respective application.

Next description is given of the brine consumption detection means 9. It is configured that a singularity of the brine consumption detection means 9 is provided on the brine tank 6. Consequently, providing a singularity of the brine consumption detection means 9 enables individual detection of the consumption of brine in regenerating operation in each of the water softeners 21 and 22. Herein, if the brine tank 6 is provided on the both water softeners 21 and 22, the brine consumption detection means 9 is also provided on the both water softeners 21 and 22.

Further, description will be made of the hardness leakage detection means 13. Similar to the first embodiment, a singularity of the hardness leakage detection means 13 is disposed downstream from the treated water quantity measurement means 12. This enables individual detection of hardness leakage in water flowing operation in each of the water softeners 21 and 22 with one detection means. Similar to the inlet hardness measurement means 11 and the treated water quantity measurement means 12, providing the hardness leakage detection means 13 on each of the treated water lines 26 and 27, that is providing the hardness leakage detection means 13 on the both water softeners 21 and 22, is naturally preferable corresponding to respective application.

Herein, the operation of the second embodiment will be described. First, similar to the regeneration control of the first embodiment, regeneration of the water softeners 21 and 22 is individually controlled so that at the point when the integrated value of either of the water softeners under water flowing operation reaches the setting value, regenerating operation of the water softener is commenced.

Description will now be made of the second embodiment in the case where the first water softener 21 is under water flowing operation and the second water softener 22 is in the standby state after completing the regenerating operation. In this state, the first water softener 21 is connected to the feedwater line 4 through the first feedwater line 23 and also connected to the treated water line 5 through the first treated water line 26. The first water softener 21 is connected to the brine tank 6 through the brine line 7 and the first brine line 30. The second water softener 22 is connected to the feedwater line 4 through the second feedwater line 24, while its connection to the treated water line 5 and to the brine line 7 is blocked by operation of the joint means 28 and the switching means 29.

While the first water softener 21 is under water flowing operation, the control unit 15 calculates an integrated value of a hardness removal amount of the first water softener 21 with the lapse of time based on the evaluated values from the inlet hardness measurement means 11 and the treated water quantity measurement means 12. When the integrated value of the first water softener 21 reaches the setting value, the control unit 15 terminates water flowing operation of the first water softener 21 and commences regenerating operation. At the same time, the control unit 15 switches the joint means 28 to connect the second treated water line 27 of the second water softener 22 to the treated water line 5. As a result, connection between the first treated water line 26 of the first water softener 21 and the treated water line 5 is blocked. This brings the first water softener 21 into the regenerating operation state, and brings the second water softener 22 into the water flowing operation state.

When the integrated value of the second water softener 22 reaches the setting value, water flowing operation of the second water softener 22 is terminated and regenerating operation is commenced as with the above-stated case. At the same time, the first water softener 21, which completed regenerating operation and is in a standby state, starts water flowing operation. Hereafter such control is repeated to shift the both water softeners 21 and 22 to the water flowing operation state and the regenerating operation state alternately, thereby enabling continuous supply of treated water for over 24 hours.

The outlined regenerating operation of the both water softeners 21 and 22 will be described here. Similar to usually conducted regenerating operation, the regenerating operation includes the steps of back washing, brine regeneration, flushing, and refilling of water. Each of the steps is individually performed by control of each control valve 3.

Therefore in the second embodiment, when each step is completed, the control unit 15 operates the switching means 29 to connect the control valve 3 of a water softener under water flowing operation to the brine line 7. More specifically, one water softener under water flowing operation, which is disconnected to the brine line 7 in an early stage of water flowing, is connected to the brine line 7 at the point when the other water softener completes each step. Then the other water softer enters into a standby state for next water flowing operation.

Further, the control unit 15 calculates brine concentration in regenerating operation in the water softener in a standby state based on a detected value by the brine concentration detection means 8, and determines a regeneration degree based on the calculated value, while at the same time it calculates brine consumption in regenerating operation in the water softener in a standby state based on a detected value by the brine consumption detection means 9. Then, based on the determination result of the regeneration degree and the calculated value of the brine consumption, the control unit 15 calculates a hardness removal amount available by the next regeneration. Then based on the calculated value, there is set a hardness removal amount till the next regeneration.

Herein, description is given of the operation of the hardness leakage detection means 13. Similar to the first embodiment, the hardness leakage detection means 13 is a backup control means when feedwater is under softening treatment. When hardness leakage is reported from the hardness leakage detection means 13 to the control unit 15, the control unit 15 determines that degradation of the ion exchange resin and the like occurs and raises an alarm from the alarm 16 to notify the hardness leakage, while it shifts a water softener under water flowing operation to regenerating operation. At the same time the control unit 15 commences water flowing operation of the water softener in a standby state.

As described above, according to the second embodiment, continuous supply of treated water for over 24 hours is implemented.

Figure 3:
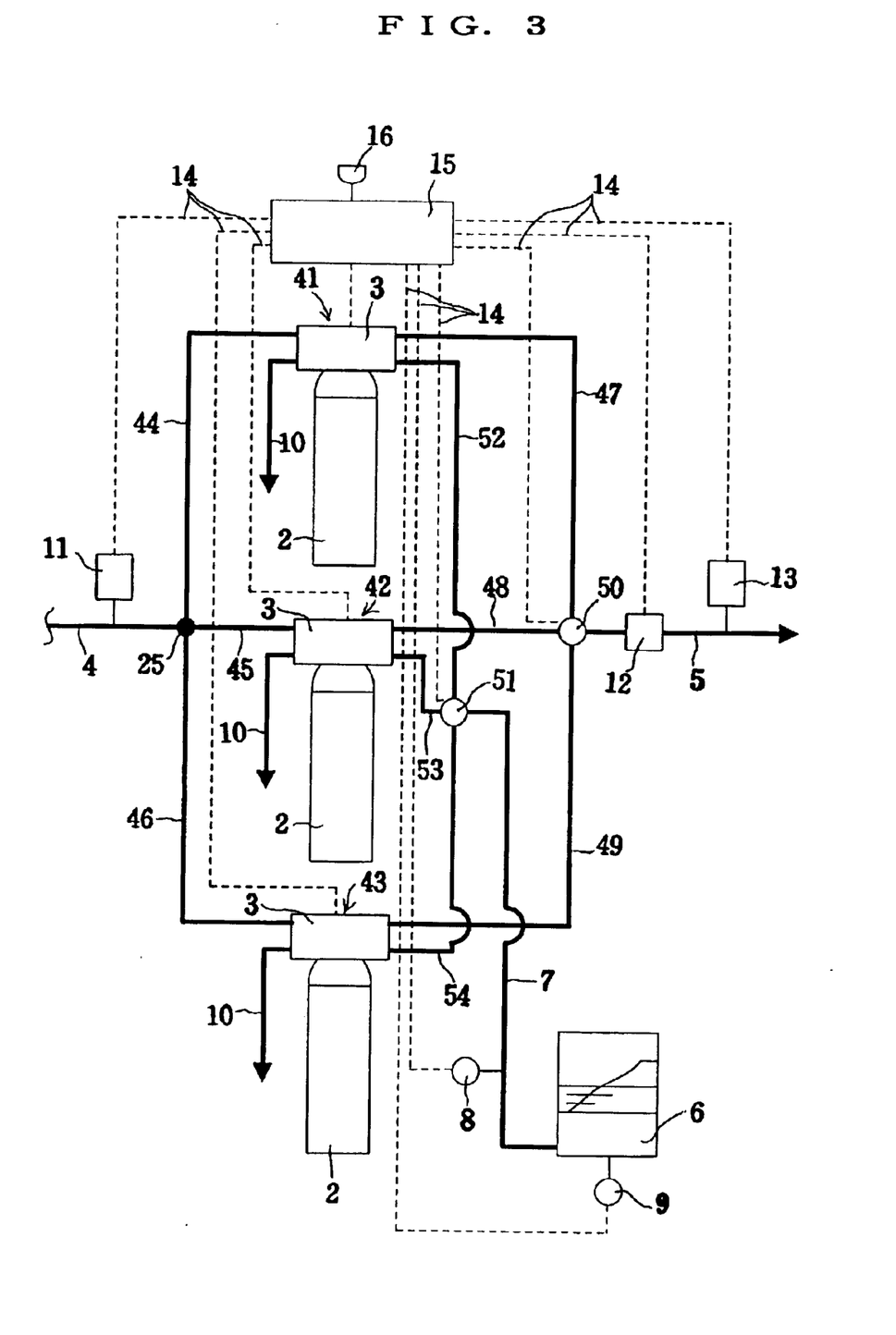
FIG. 3 is a schematic view showing an outline of a third embodiment of the present invention.

Next, the third embodiment of the present invention will be described in detail with reference to FIG. 3. In FIG. 3 showing the third embodiment, the reference numerals same as those used in FIG. 1 and FIG. 2 showing the first embodiment and the second embodiment designate the same component members, and therefore detailed description thereof will be omitted.

FIG. 3 is a schematic view showing a configuration for supporting the case of requiring a continuous supply of water treated by a water softening device for over 24 hours, in which three water softeners 1 are disposed in parallel. In FIG. 3, among the components composing the water softening device, the sharable components are shown as shared.

In FIG. 3, a third water softener 41, a fourth water softener 42 and a fifth water softener 43 are disposed in parallel between the feedwater line 4 and the treated water line 5, and each softener is connected so as to be individually in the state of water flowing operation (water softening operation) and in the state of regenerating operation.

First, description will be given of the inlet side of feedwater in each of the water softeners 41, 42, 43. Each of the water softeners 41, 42, 43 and the feedwater line 4 are connected to each other through a third feedwater line 44, a fourth feedwater line 45, and a fifth feedwater line 46 branched from the feedwater line 4. Upstream to a branching portion 25 of each of the feedwater lines 44, 45, 46 (i.e., a portion of the feedwater line 4), the inlet hardness measurement means 11 is provided. Consequently, providing a singularity of the inlet hardness measurement means 11 enables detection of the inlet hardness of feedwater to each of the water softeners 41, 42, 43. It is natural that the inlet hardness measurement means 11 is preferably provided on each of the feedwater lines 44, 45, 46 corresponding to respective application.

Next description will be given of the outlet side of treated water in each of the water softeners 41, 42, 43. A third treated water line 47 of the third water softener 41, a fourth treated water line 48 of the fourth water softener 42, and a fifth treated water line 49 of the fifth water softener 43 are joined via a joint means 50 such as four-way valves, the joint means 50 being connected to the treated water line 5. Switching operation of the joint means 50 connects either the treated water line 47, 48 or 49 to the treated water line 5. Downstream from the joint means 50 (i.e., a portion of the treated water line 5), the treated water quantity measurement means 12 is provided. Consequently, providing a singularity of the treated water quantity measurement means 12 enables individual detection of the quantity of treated water when water flows through each of the water softeners 41, 42, 43. Similar to the inlet hardness measurement means 11, it is natural that the treated water quantity measurement means 12 is preferably provided on each of the treated water lines 47, 48, 49 corresponding to respective application.

Next description will be given of the brine concentration detection means 8. The brine concentration detection means 8 is provided on the brine line 7 which connects the brine tank 6 to each of the water softeners 41, 42, 43. Description will herein given of a configuration in the case of disposing a singularity of the brine tank 6 as a practical example of the embodiment. On the downstream side or the side closer to each of the water softeners 41, 42, 43, the brine line 7 is branched into a third brine line 52, a fourth brine line 53, and a fifth brine line 54 via a switching means 51 such as four-way valves, the third brine line 52 being connected to the control valve 3 of the third water softener 41, the fourth brine line 53 being connected to the control valve 3 of the fourth water softener 42, and the fifth brine line 54 being connected to the control valve 3 of the fifth water softener 43. Therefore, switching operation of the switching means 51 feeds brine in the brine tank 6 to either the water softener 41, 42 or 43. Upstream to the switching means 51, a singularity of the brine concentration detection means 8 is provided on the brine line 7. Consequently, providing a singularity of the brine concentration detection means 8 enables individual detection of the concentration of brine in regenerating operation in each of the water softeners 41, 42, 43.

Here, the brine concentration detection means 8 may be preferably provided on the brine tank 6 corresponding to respective application. Further, similar to the inlet hardness measurement means 11 and the treated water quantity measurement means 12, providing the brine concentration detection means 8 on each of the brine lines 52, 53, 54, that is providing the brine concentration detection means 8 on each of the water softeners 41, 42, 43, is preferable corresponding to respective application.

Next description is given of the brine consumption detection means 9. It is configured that a singularity of the brine consumption detection means 9 is provided on the brine tank 6. Consequently, providing a singularity of the brine consumption detection means 9 enables individual detection of the consumption of brine in regenerating operation in each of the water softeners 41, 42, 43. Herein, if the brine tank 6 is provided on each of the water softeners 41, 42, 43, the brine consumption detection means 9 is also provided on each of the water softeners 41, 42, 43.

Further, description will be made of the hardness leakage detection means 13. Similar to the first embodiment and the second embodiment, a singularity of the hardness leakage detection means 13 is disposed downstream from the treated water quantity measurement means 12. This enables individual detection of hardness leakage in water flowing operation in each of the water softeners 41, 42, 43 with one detection means. Similar to the inlet hardness measurement means 11 and the treated water quantity measurement means 12, providing the hardness leakage detection means 13 on each of the treated water lines 47, 48, 49, that is providing the hardness leakage detection means 13 on each of the water softeners 41, 42, 43, is naturally preferable corresponding to respective application.

Herein, the operation of the third embodiment will be described. First, similar to the regeneration control of the first embodiment and the second embodiment, regeneration of each of the water softeners 41, 42, 43 is individually controlled so that at the point when the integrated value of either of the water softeners under water flowing operation reaches the setting value, regenerating operation of the water softener is commenced.

Description will now be made of the third embodiment in the case where the third water softener 41 is under water flowing operation, the fourth water softener 42 is under regenerating operation, and the fifth water softener 43 is in the standby state. In this state, the third water softener 41 is connected to the feedwater line 4 through the third feedwater line 44 and also connected to the treated water line 5 through the third treated water line 47. The third water softener 41 is connected to the brine tank 6 through the brine line 7 and the third brine line 52. The fourth water softener 42 is connected to the feedwater line 4 through the fourth feedwater line 45, while its connection to the treated water line 5 is blocked by operation of the joint means 50. Further, the fifth water softener 43 is connected to the feedwater line 4 through the fifth feedwater line 46, while its connection to the treated water line 5 and to the brine line 7 is blocked by the operation of the joint means 50 and the switching means 51.

While the third water softener 41 is under water flowing operation, the control unit 15 calculates an integrated value of a hardness removal amount of the third water softener 41 with the lapse of time based on the evaluated values from the inlet hardness measurement means 11 and the treated water quantity measurement means 12. When the integrated value of the third water softener 41 reaches the setting value, the control unit 15 terminates water flowing operation of the third water softener 41 and commences regenerating operation. At the same time, the control unit 15 switches the joint means 50 to connect the fourth treated water line 48 of the fourth water softener 42 to the treated water line 5. At the same time, the switching means 51 is operated to connect the third brine line 52 of the third water softener 41 to the brine line 7. As a result, connection between the third treated water line 47 of the third water softener 41 and the treated water line 5 is blocked. This brings the third water softener 41 into the regenerating operation state, the fourth water softener 42 into the water flowing operation state, and the fifth water softener 43 into the standby state.

When the integrated value of the fourth water softener 42 reaches the setting value, water flowing operation of the fourth water softener 42 is terminated and regenerating operation is commenced as with the above-stated case. At the same time, water flowing operation of the fifth water softener 43, which is in a standby state, is commenced. At this point, regenerating operation of the third water softener 41 is completed and the third water softener 41 is in a standby state. Hereafter such control is repeated to shift each of the water softeners 41, 42, 43 to the water flowing operation state, the regenerating operation state and the standby state in rotation, thereby enabling continuous supply of treated water for over 24 hours.

The outlined regenerating operation of each of the water softeners 41, 42, 43 will be described here. Similar to usually conducted regenerating operation as stated in description of the second embodiment, the regenerating operation includes the steps of back washing, brine regeneration, flushing, and refilling of water. Each of the steps is individually performed by control of each control valve 3 of the water softeners 41, 42, 43.

Therefore in the third embodiment, when each step is completed, the control unit 15 operates the switching means 51 to connect the control valve 3 of a water softener under water flowing operation to the brine line 7. More specifically, a water softener under water flowing operation, which is disconnected to the brine line 7 in an early stage of water flowing, is connected to the brine line 7 at the point when a water softener under regenerating operation completes each step. Then the water softer that completed regenerating operation enters into a standby state for next water flowing operation.

Further, the control unit 15 calculates brine concentration of the water softener in a standby state based on a detected value by the brine concentration detection means 8, and determines a regeneration degree based on the calculated value, while at the same time it calculates brine consumption in regenerating operation in the water softener in a standby state based on a detected value by the brine consumption detection means 9. Then, based on the determination result of the regeneration degree and the calculated value of the brine consumption, the control unit 15 calculates a hardness removal amount available by the next regeneration. Then based on the calculated value, there is set a hardness removal amount till the next regeneration.

Herein, description is given of the operation of the hardness leakage detection means 13. Similar to the first embodiment and the second embodiment, the hardness leakage detection means 13 is a backup control means when feedwater is under softening processing. When hardness leakage is reported from the hardness leakage detection means 13 to the control unit 15, the control unit 15 determines that degradation of the ion exchange resin and the like occurs, raises an alarm from the alarm 16 to notify the hardness leakage, and immediately shifts the water softener under water flowing operation to regenerating operation. At the same time the control unit 15 commences water flowing operation of the water softener in a standby state.

As described above, according to the third embodiment, continuous supply of treated water for over 24 hours is implemented. In addition, if the regenerating operation falls behind the water flowing operation, presence of a water softener in a standby state ensures supply of treated water for over 24 hours without stopping the water flowing operation unlike the case of using two water softeners.

According to the present invention as is clear from the above description, efficient regeneration of ion exchange resin is implemented, which makes it possible to save brine necessary for regenerating operation. In addition, providing a hardness leakage detection means on a treated water line makes it possible to raise a hardness leakage alarm as well as to immediately shift a water softener to regenerating operation when hardness leakage is detected, thereby preventing effluence of hardness components to a soft water tank. Further, disposing a plurality of water softening devices in parallel enables continuous supply of treated water for over 24 hours.

What is claimed is:

1. A water softening apparatus comprising:
   inlet hardness measurement means for measuring hardness of feedwater to a water softening apparatus, treated water quantity measurement means for measuring a flow rate of treated water after passing through the water softening apparatus, brine concentration detection means for detecting concentration of brine in regenerating operation, and brine consumption detection means for detecting consumption of brine in regenerating operation; and
   a control means connected to said means for measuring hardness, means for measuring flow rate, brine concentration detection means and brine consumption detection means for controlling a regeneration commencing time by determining a setting value of a hardness removal amount available based on outputs from said brine concentration detection means and said brine consumption detection means and comparing the setting value to an integrated value of hardness removal amount based on outputs from said hardness measuring means and treated water quality measurement means.

2. The water softening apparatus as defined in claim 1, comprising hardness leakage detection means for measuring hardness of treated water after passing through the water softening apparatus and detecting hardness leakage.

3. A water softening apparatus comprising a plurality of water softening devices disposed and connected in parallel with water flowing operation and regenerating operation of each water softening device switchable, the water softening apparatus, being composed of inlet hardness measurement means for measuring hardness of feedwater to a water softening apparatus, treated water quantity measurement means for measuring a flow rate of treated water after passing through the water softening apparatus, brine concentration detection means for detecting concentration of brine in regenerating operation, and brine consumption detection means for detecting consumption of brine in regenerating operation; and
   a control means connected to said means for measuring hardness, means for measuring flow rate, brine concentration detection means and brine consumption detection means for controlling a regeneration commencing time by determining a setting value of a hardness removal amount available based on outputs from said brine concentration detection means and said brine consumption detection means and comparing the setting value to an integrated value of hardness removal amount based on outputs from said hardness measuring means and treated water quality measurement means.

4. The water softening apparatus as defined in claim 3, wherein a branching portion for branching feedwater to each of the water softening devices is provided on a feedwater line to each of the water softening devices, and joint means for joining treated water from each of the water softening devices is provided, the joint means being connected to a treated water line.

5. The water softening apparatus as defined in claim 4, wherein the inlet hardness measurement means is provided upstream to the branching portion and the treated water quantity measurement means is provided downstream from the joint means.

6. The water softening apparatus as defined in claim 4, wherein the hardness leakage detection means for measuring hardness of treated water after passing through the water softening apparatus and detecting hardness leakage is provided downstream from the joint means.

7. The water softening apparatus as defined in claim 3, comprising a singularity of brine tank, the brine tank being connected to each of the water softening devices; in a switchable way via switching means provided on a brine line, the brine concentration detection means being provided upstream to the switching means.

8. The water softening apparatus as defined in claim 7, wherein the brine consumption detection means is provided on the brine tank.

* * * * *